March 13, 1928.  
W. N. BOOTH  
1,662,412  
MACHINE FOR ASSEMBLING SPOKED WHEELS  
Original Filed May 10, 1922  2 Sheets-Sheet 2

Inventor  
William N. Booth  
By  
Attorneys

Patented Mar. 13, 1928.

1,662,412

UNITED STATES PATENT OFFICE.

WILLIAM N. BOOTH, OF DETROIT, MICHIGAN.

MACHINE FOR ASSEMBLING SPOKED WHEELS.

Original application filed May 10, 1922, Serial No. 559,701. Divided and this application filed ~~~~~~, 1926. Serial No. 148,538.

The invention relates to machines for assembling spoked wheels particularly of that type having metallic fellies or permanent rims.

Heretofore, spoked wheels provided with permanent rims have been assembled by laterally forcing the spokes into substantially the same plane and depending on the outward radial pressure resulting from the lateral pressure to seat the spokes upon the rim, these spokes being held in permanent position by their inner double mitered end portions. But wheels assembled by this method have been found unsatisfactory since their spokes did not have firm seats upon the rims, and consequently, weakened the wheels. With my invention, this objectionable feature is overcome by the provision of means engageable with the inner ends of the spokes to radially force the same outwardly to a firm seat upon the permanent rim of the wheel, and also by the provision of means engageable with the sides of the spokes to laterally force the same into their permanent position.

Other objects of my invention are the provision of means for distributing the pressure over the inner ends of the spokes for radially forcing the latter outwardly and the provision of expansible members upon both the head and support for engaging the spokes. The invention has for further objects the novel features of construction and combinations and arrangements of parts as more fully hereinafter set forth.

This application is a division of my copending application Serial Number 559,701, filed May 10, 1922, upon "Machine for assembling spoked wheels".

In the drawings:—

Figure 1:
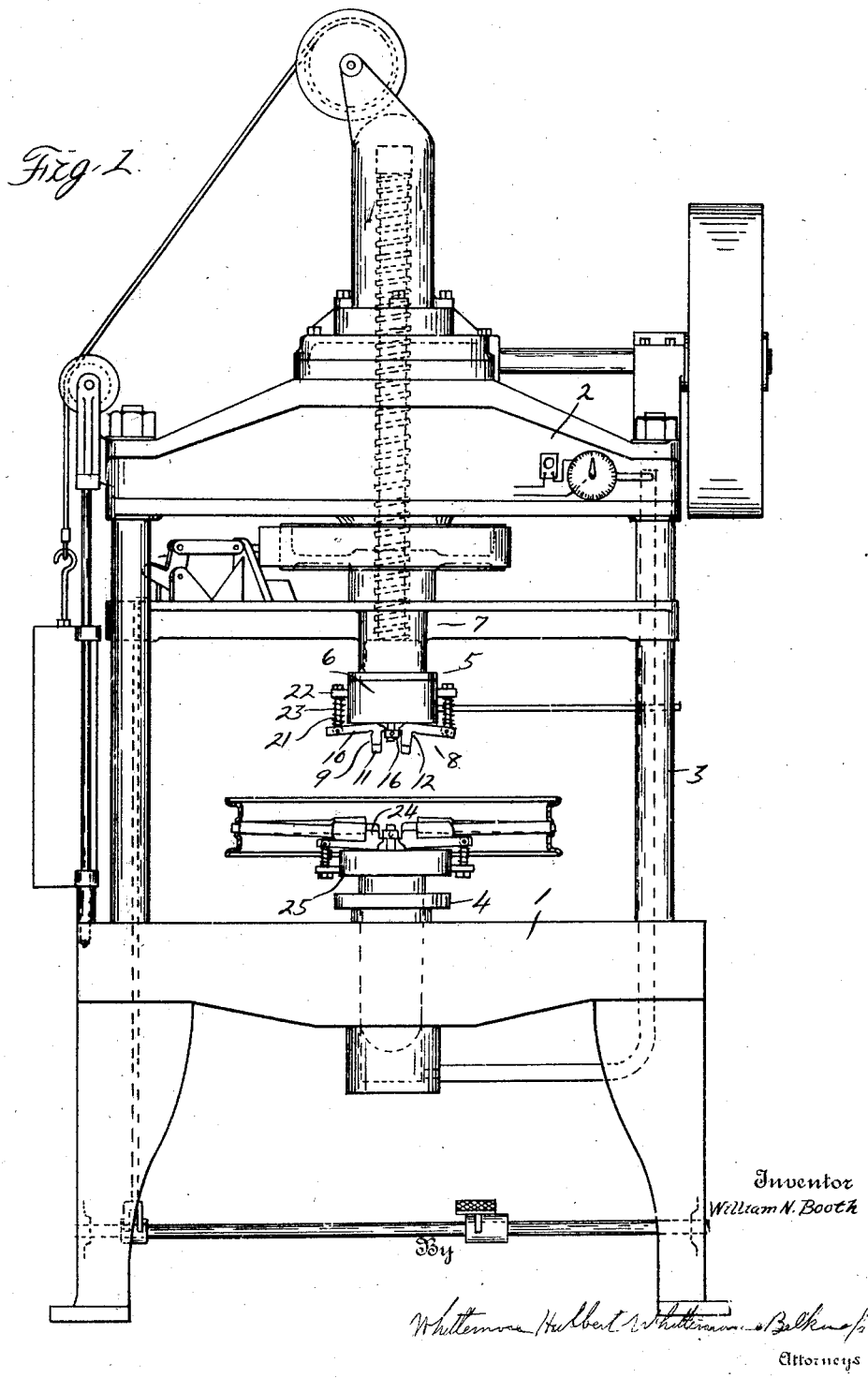
Figure 1 is a front elevation of a machine for assembling spoked wheels embodying my invention.
Figure 2:
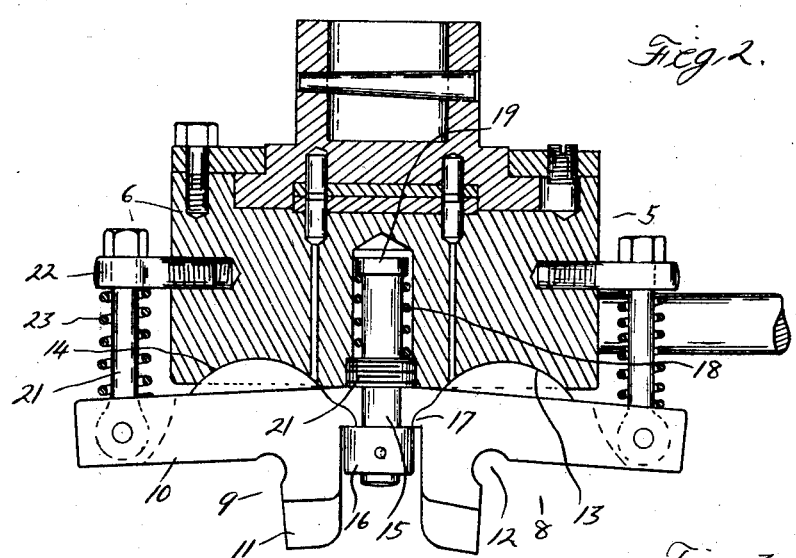
Figures 2 and 3 are enlarged cross sections, respectively, through the expanding head and support.
Figure 3:
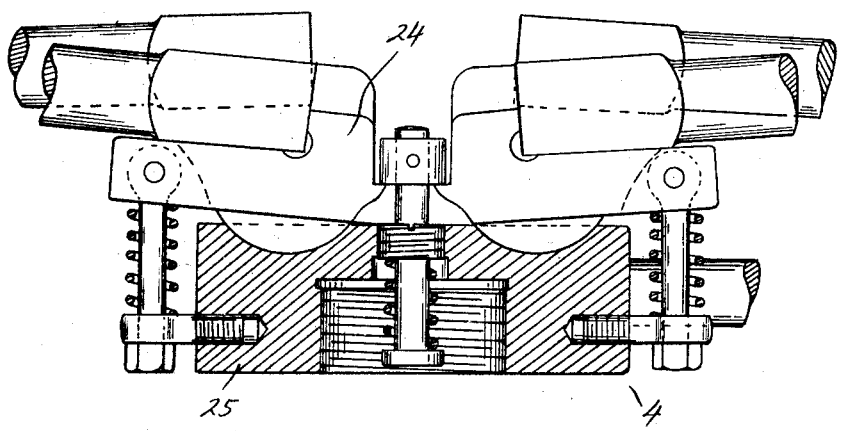

The machine for assembling spoked wheels, as shown, has the base 1 and the head 2 supported upon the shouldered columns 3 at the ends of the base. 4 is a support for the spoked wheel engageable with its spokes and carried upon the base 1. 5 is a head movable toward and away from the support 4 and adapted to cooperate therewith to radially force the spokes outwardly into firm engagement with the felly or permenent rim of the wheel and also to laterally force the spokes into their permanent position. In the usual construction of wheel the spokes have their seats either in the same plane or slightly dished.

Both the support 4 and head 5 are of the expanding type and comprise expansible members which are so arranged that their outward radial pressure upon the inner ends of the spokes is distributed thereover. As shown, the expanding head 5 has the body 6 carried by the adapter 7 and carrying the expansible member 8. This expansible member comprises the annular series of radially extending bell crank shaped jaws 9 having the lateral arms 10 and the depending arms 11, the faces of the depending arms which are engageable with the inner ends of the spokes being at right angles to the faces of the lateral arms which are engageable with the sides of the spokes. Each jaw also has the rounded cut-out part 12 connecting the inner ends of these faces and providing clearance for the corner of the spoke so that the latter will not be damaged. The lateral arms 10 have the rounded upper faces 13 engaging in rounded bearings 14 in the lower end of the body 6. To yieldably hold these jaws so that the bearing faces upon the depending arms 11 are inclined inwardly to properly engage the spokes in their initial assembled positions, I have provided the pull rod 15 extending axially within the body 6 and provided with the collar 16 secured to its lower end, this collar supporting the inner ends of the jaws by engaging the lugs 17 at the inner ends thereof. 18 is a coil spring surrounding the pull rod and located within the body 6 and abutting the enlargment 19 at the upper end of the pull rod and the retainer 20 surrounding the pull rod below its upper end and threadedly engaging the body. I have also provided the eye bolts 21 extending longitudinally of the body at its sides through the eye bolts 22 extending transversely of the body and threadedly engaging the same, the lower end of the eye bolts 21 being pivotally connected to the outer ends of the lateral arms 6. 23 are compression coil springs surrounding the eye bolts 21 and abutting the eye bolts 22 and the upper faces of the lateral arms 10.

The expanding support 4 has the annular series of radially extending bell crank shaped jaws 24 which are constructed in the same manner as the jaws 9 and are yieldably held to their seats upon the body 25 of the support in the same manner as the jaws 9. The jaws 24 face upwardly and are arranged so that when the expanding head 5 is moved downwardly into engagement with the spokes of the wheel the jaws of the support alternate with the jaws of the head.

In operation, the partly assembled wheel having its double mitered spokes engaging in the felly or permanent rim and partially engaging each other so that their axes are in angular relation is placed upon the support 4 with the lower series of spokes resting upon the jaws of this support. The head 5 is then lowered to bring its jaws into engagement with the upper series of spokes. The jaws of both the support and head in their normal positions are so arranged that the ends of both series of spokes are engaged throughout their whole area with the exception of their corners, and consequently, the radial outward pressure exerted upon the spokes by the movement of the head toward the support is distributed, thereby limiting liability of damaging the spokes. During the movement of the head toward the support it will be seen that the jaws of the head and support rock relative to the bodies of the head and support to radially force the spokes outwardly into firm engagement with the felly or permanent rim and at the same time allow the spokes to be laterally forced into their permanent position.

What I claim as my invention is:

1. In a machine for assembling spoked wheels, the combination with angularly movable means engageable with the inner ends of the spokes over an extended area when the spokes are in angular relation to each other and during their movement to permanent position to radially force the spokes outwardly into engagement with the rim, of means engageable with the sides of the spokes to laterally force the same into permanent position and means for actuating said spoke end and side engaging means.

2. In a machine for assembling spoked wheels in partially assembled condition where the spokes engage the permanent rim and are in angular relation to each other, the combination of rockable cooperating series of members each provided with means for engaging the inner ends of the spokes to radially force the same outwardly into firm engagement with the rim, and with means engageable with the sides of the spokes to laterally force the spokes into permanent position.

3. In a machine for assembling spoked wheels in partially assembled condition where the spokes engage the permanent rim and are in angular relation to each other, the combination with a support for the wheel comprising a series of spaced radial bell crank-shaped jaw members, of a head comprising a series of radial bell crank-shaped jaw members adapted to alternate with the jaw members of said support, all of said jaw members having portions engageable with the inner end and one side of a spoke, and means for moving said head and support toward each other.

4. In a machine for assembling spoked wheels in partially assembled condition where two series of spokes engage the permanent rim and are in angular relation to each other, the combination with a support for the wheel comprising a base and an annular series of spaced bell crank-shaped jaw members rockably mounted upon said body, said jaw members engaging one series of spokes and each having a portion for engaging the lower face and the inner end of a spoke of this series, of a head comprising a body and an annular series of spaced jaw members rockably mounted thereon, said jaw members being engageable with the other series of spokes and each having portions for engaging the upper face and the inner end of a spoke of this series, and means for moving said head and support toward each other.

In testimony whereof I affix my signature.

WILLIAM N. BOOTH.